C. A. O. & G. A. P. BOHM.
Process and Apparatus for Preparing Maize-Mash from whole Kernels.

No. 213,092. Patented Mar. 11, 1879.

3 Sheets—Sheet 1.

Witnesses

Inventors
C. A. O. and G. A. P. Bohm
per A. Schlichting
Attorney

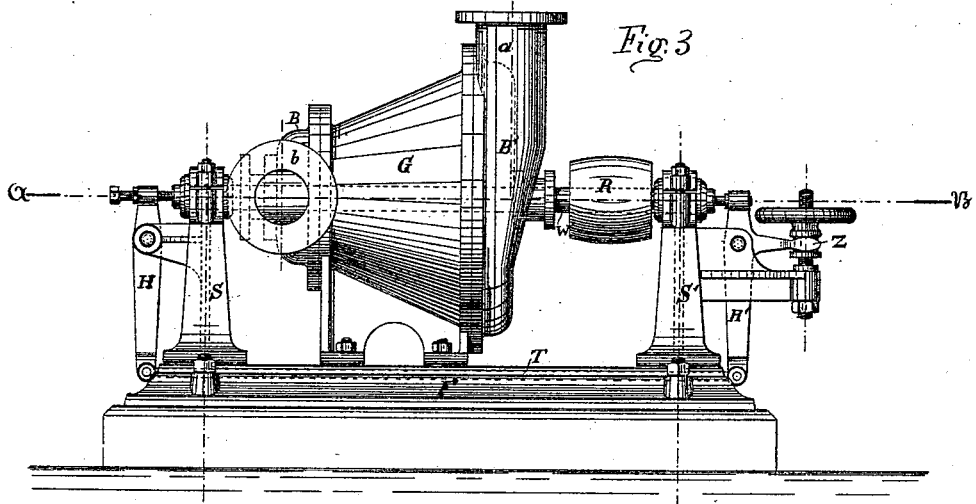
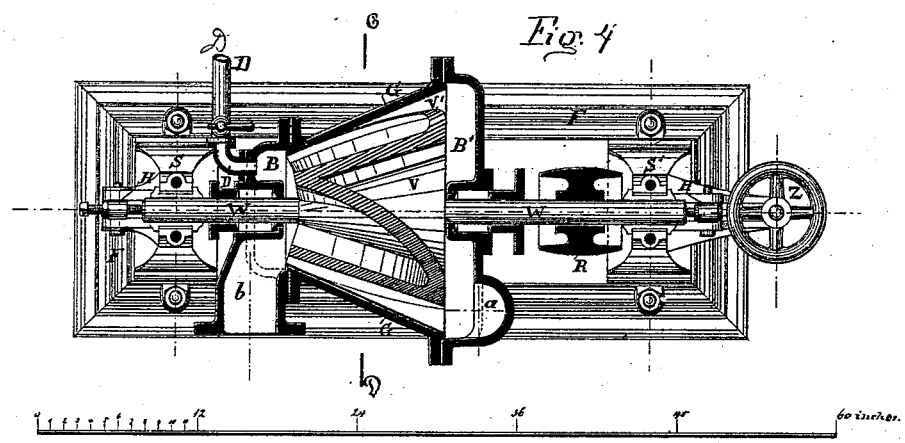

C. A. O. & G. A. P. BOHM.
Process and Apparatus for Preparing Maize-Mash from whole Kernels.

No. 213,092. Patented Mar. 11, 1879.

3 Sheets—Sheet 3.

Witnesses
M. Gardner
F. B. Groff

Inventors
C. A. O. and G. A. P. Bohm
per A. Schickling
Attorney

UNITED STATES PATENT OFFICE.

CARL A. O. BOHM AND GOTTLOB A. P. BOHM, OF FREDERSDORF, NEAR BERLIN, PRUSSIA.

IMPROVEMENT IN PROCESSES AND APPARATUS FOR PREPARING MAIZE-MASH FROM WHOLE KERNELS.

Specification forming part of Letters Patent No. 213,092, dated March 11, 1879; application filed July 17, 1877.

*To all whom it may concern:*

Be it known that we, CARL AUGUST OTTO BOHM and GOTTLOB ADOLPH PAUL BOHM, at the village of Fredersdorf, near Berlin, Prussia, have invented an Improved Process and Apparatus for Preparing Maize - Mash from Whole Kernels, of which the following is a specification:

The invention relates to certain improvements in the art of reducing and mashing maize and preparing the same for fermentation; and has for its object to improve upon the mashing processes and apparatuses of G. Ellenberger and J. d'Heureuse, for which patents were granted in the United States October 26, 1875, and April 25, 1876, and the processes of Hollefreund, Bohm, and Henze, in general use in Germany.

The main feature of the invention consists in the combination, with a steaming apparatus or close vessel in which whole grains or kerkels are treated with steam, of a hulling apparatus, which is located in juxtaposition to said steaming-vessel, and connected therewith in such a manner that a continuous circulation of the grains will take place from the steamer to the hulling apparatus until said grains have been thoroughly hulled, which will expedite the reducing or boiling process in the steaming-chamber.

The invention also consists in other details of construction and arrangement, which will be fully described, and then indicated in the claims.

Figure 1:
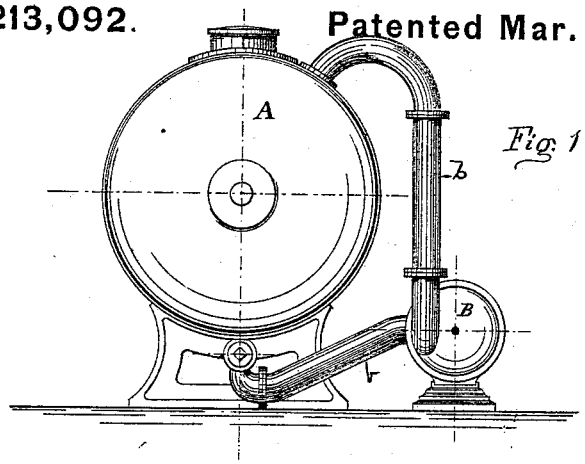
Figure 2:
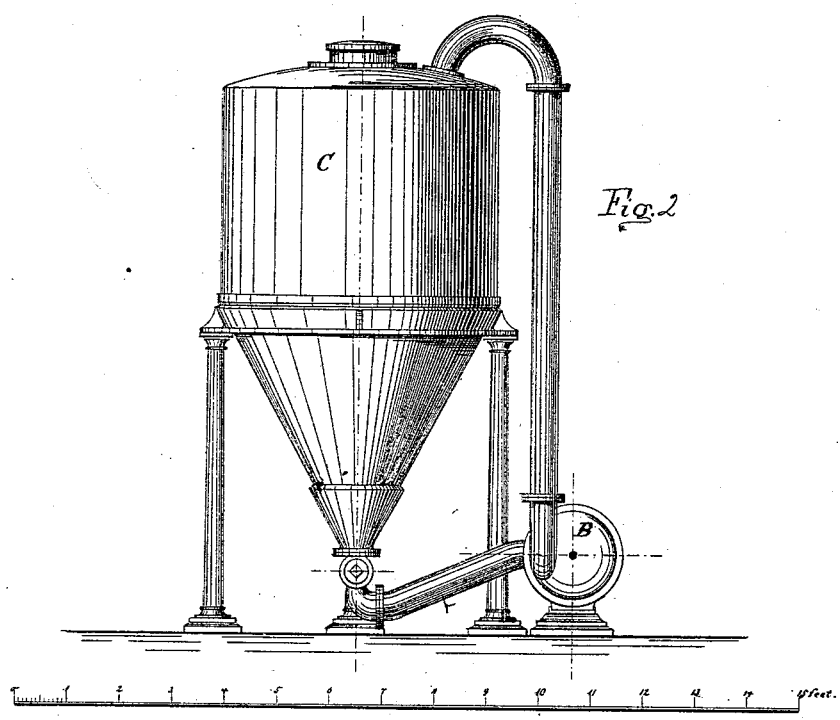
Figure 5:
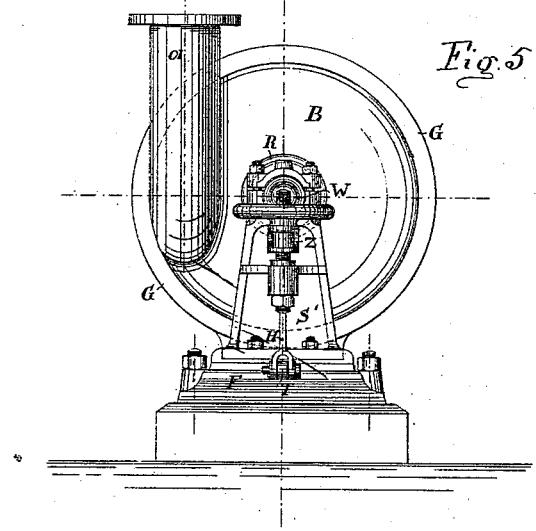
Figure 6:
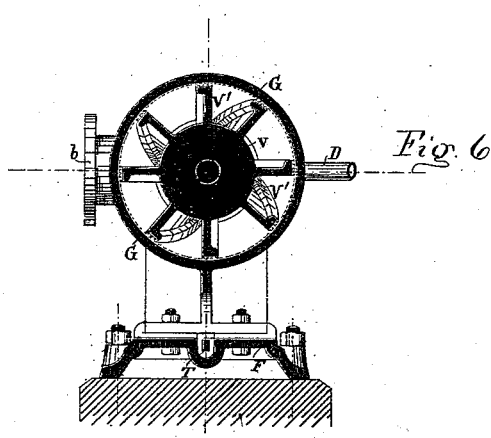

In the accompanying drawings, Figure 1 illustrates the general arrangement of a Hollefreund steaming or grain-reducing apparatus and our improved hulling-machine. Fig. 2 shows a close steaming-chamber, such as is used by Henze, and our hulling apparatus combined therewith. Fig. 3 is a side elevation of our hulling apparatus. Fig. 4 is a horizontal longitudinal section of the same, taken on the line A B of Fig. 3. Fig. 5 is a front elevation, and Fig. 6 is a transverse section through the line C D of Fig. 4.

Before entering upon a description of our invention we desire to take notice of the state of the art as revealed by the processes of Ellenberger, d'Heureuse, Hollefreund, Henze, and others, which are in general use, and upon which our invention is an improvement.

In all these processes for preparing maize for the mashing process the time required for softening and reducing the maize-kernels is materially lengthened or protracted by reason of the presence of the hulls on the kernels, and when these hulls and the germs are comminuted or finely reduced by passing the maize through a grinding apparatus, as in the Ellenberger and other processes, these particles of hulls and germs will exert an injurious influence upon the mash, and cause the foamy fermentation thereof.

In the drawings, letter A, Fig. 1, denotes a Hollefreund steaming-cylinder, which contains a series of agitating - arms, and is provided with the usual inlet and outlet pipes and openings for the steam and grain. The inlet of the grain takes place at the highest point of the cylinder, and the outlet of the same at the lowest point. This is also the case with the Henze steaming apparatus. (Designated by the letter C in Fig. 2.) Either may be used with equal facility in connection with our hulling apparatus, which consists of the conical shell or casing G, tightly closed at both ends by means of the heads B B. The shell or casing G is supported on a base or foundation plate. A shaft, W, passes longitudinally through the casing, is made tight in the heads thereof by stuffing-boxes, and is journaled in standards S S' of the frame. Inside of the casing the shaft has a cone-shaped enlargement, V, which is formed with or carries a series of ribs or wings, V', which are so disposed as to form a series of wedge-shaped chambers in connection with the shell or casing G. The ribs are generally eight in number, half of which run straight from the base to the apex of the cone, and the other ribs run in spiral direction from the base to the apex of the cone, forming thereby a series of reversed chambers, four of which communicate directly with the smaller or inlet portion of the casing, and the other four lead directly into the larger or outlet portion of said casing. The outer edges of the ribs are widened or flanged, and they, as well as the inner walls of the casing, may be channeled, roughened, or ribbed. The cone, with its ribs, fits into the casing, so that said ribs will nearly come in contact with the ribbed surface of the casing.

a represents a discharge-pipe, located at the large end of the casing G, and communicating with the upper end of the steaming-chamber A or C. The letter b denotes a feed or inlet pipe, arranged at the side of the smaller end of the casing, and communicating with the bottom of the steaming-chamber. D is a steam-inlet pipe, running parallel with the shaft of the winged cone at the small end of the cylinder, and provided with a stop-cock. This pipe D is connected with a suitable steam boiler and generator, for the purpose of admitting a jet of live steam into the hulling-chamber. H H' are vertical levers, pivoted to the standards of the frame and provided with points or spurs, which are centered in the ends of the cone-shaft W. These levers are connected by an arm, T, located beneath the base-plate E, so that it will be possible to adjust the cone within the casing for causing the same to fit more or less tight. This adjustment is effected by means of a screw-nut, Z, and a screw-shaft acting upon an arm of one of the levers H, as is shown more clearly in Fig. 3 of drawings.

The object of adjusting the cone by the above-mentioned means is to enable all the kernels of maize, large and small, to be acted upon by the hulling devices. Thus the cone will first act upon the large kernels, and then, by setting the cone nearer the shell, the smaller kernels will be subjected to the hulling action, when the mass is again passed into the hulling apparatus from the steaming-chamber.

A belt-pulley, R, on the shaft serves to transmit power to the same from some suitable prime motor. When the apparatus is in operation the cone is adjusted so that the space between the ribs and the casing will be a little smaller than the diameter of the maize-kernels. The communication with the steaming-chamber is then opened, and the steam-pipe D caused to discharge steam into casing G. The maize undergoing the cooking or steaming process in the chamber A or C will be forced out by steam-pressure into the hulling apparatus, where it is received by the wings of the cone and thrown centrifugally against the casing until the hulls have been removed from the kernels. This having been done, the hulled kernels will be reduced in size, thus permitting the same to pass between the ribs and casing to the chambers at the larger end of the casing. The hulls separated from the kernels will pass with the latter into the steaming-chamber, but being left almost entire, or not reduced into fine particles, we overcome the objections to the processes in which the hulls are disintegrated with the kernels.

The operation of the hulling-cone is made quite easy, and facilitated by the direct action of the steam-jet from the pipe D upon the wings of the cone.

The object of the rear series of chambers at the larger end of the cone is to expel the maize after having been acted on by the hulling devices into the discharge-pipe leading to the steaming-chamber, and to draw or suck in an extra supply of maize, thus causing the winged cone to act very much in the manner of a centrifugal pump.

The process of treating maize according to our process may be briefly described, as follows—viz: The maize is introduced into the steaming-chamber through man-holes in the top of the same, and then a sufficient quantity of water is added for thoroughly impregnating or soaking the maize with the same. Steam is then introduced under suitable pressure until the hulls or shells of the kernels have been softened and loosened. The cock in the pipe communicating with the steaming-chamber and the hulling apparatus is then opened, which causes a circulation of the mass from the steaming-chamber into the hulling apparatus and back again into the former. This circulation and decortication of the maize takes place continuously until the mass has been sufficiently reduced, when the latter is delivered into a mashing or fermenting tub, and treated in the customary manner to prepare it for the distilling process.

Our invention may be said to differ in the following particulars from the processes hitherto in use. The maize is hulled or decorticated during the cooking process, thus expediting the same, and enabling the water to soak the kernels more quickly. The hulls of the maize are not reduced into fine particles, and thus the mass is not liable to foamy fermentation.

By the use of our apparatus it is possible to cook or reduce the maize without great steam-pressure, and we are also enabled to obtain a mash of a white color for the manufacture of yeast.

It will be understood that the grain or maize is first placed in the steaming-chamber, where it is moistened or steamed. Then it is conducted into the hulling-cylinder, where it is hulled, the moistened condition of the kernels facilitating this step of the process. The hulled kernels and the separated hulls are then forced back into steaming-chamber by the action of the hulling-cylinder and steam-jet, where the kernels are cooked or saturated in a very short time. The circulation of the grain through the hulling and steaming chamber may take place several times during the partial or entire duration of the cooking process.

We desire it to be distinctly understood that we do not first cook the grain in a steaming-chamber previous to its reduction in a separate chamber having a cylinder armed with cutters, the reduced mass passing from this reducing-chamber into the fermenting-vat or mash-tun.

Having thus described our invention, what we claim as new, and desire to secure by Letters Patent, is—

1. In the preparation of maize for mashing, the process of removing the hulls, thus accelerating the cooking operation, and avoiding the pulverization of the hulls, which would cause foamy fermentation, consisting in subjecting the partially-cooked maize, or maize previously steamed, to a grinding action continuous or simultaneous with the cooking operation, the grinding being sufficient to remove the hulls without pulverizing the same, all as set forth.

2. The combination of a stationary cone-shaped shell or casing, a revolving cone having hulling and propelling wings, a steaming or cooking chamber, and maize supply and discharge pipes connected with said hulling apparatus and steaming-chamber, as and for the purpose set forth.

3. The combination of the longitudinally-adjustable hulling-cone V V', levers H H', the connecting-bar E, and the adjusting device Z with the shell G and base-frame, as and for the purpose set forth.

In testimony whereof we have signed our names to this specification in the presence of two subscribing witnesses.

CARL AUGUST OTTO BOHM.
GOTTLOB ADOLPH PAUL BOHM.

Witnesses:
JOHANNES BRANDT,
BERTHOLD ROI.